3,796,585
METHOD OF MANUFACTURING A PIGMENT
Willem Lambertus Wanmaker and Johannes Gerardus Verriet, Emmasingel, Eindhoven, Netherlands, assignors to U.S. Philips Corporation, New York, N.Y.
Filed Dec. 6, 1971, Ser. No. 205,134
Claims priority, application Netherlands, Dec. 4, 1970, 7017715
Int. Cl. C09c 1/02; C09k 1/10; H01j 1/63
U.S. Cl. 106—288 B   6 Claims

ABSTRACT OF THE DISCLOSURE

A pigment manufactured by heating a mixture comprising $Y_2O_3$ and $MoO_3$ in which the molar ratio between $Y_2O_3$ and $MoO_3$ has a value of between 6 and 1. Up to 75 mol percent of $Y_2O_3$ may be replaced by one or more of the rare earth oxides and up to 75 mol percent of $MoO_3$ may be replaced by $WO_3$. The pigment comprises a compound defined by the formula $$2(Y_{1-x}Ln_x)_2O_3 \cdot (Mo_{1-y}W_y)O_3$$

Figure 1:
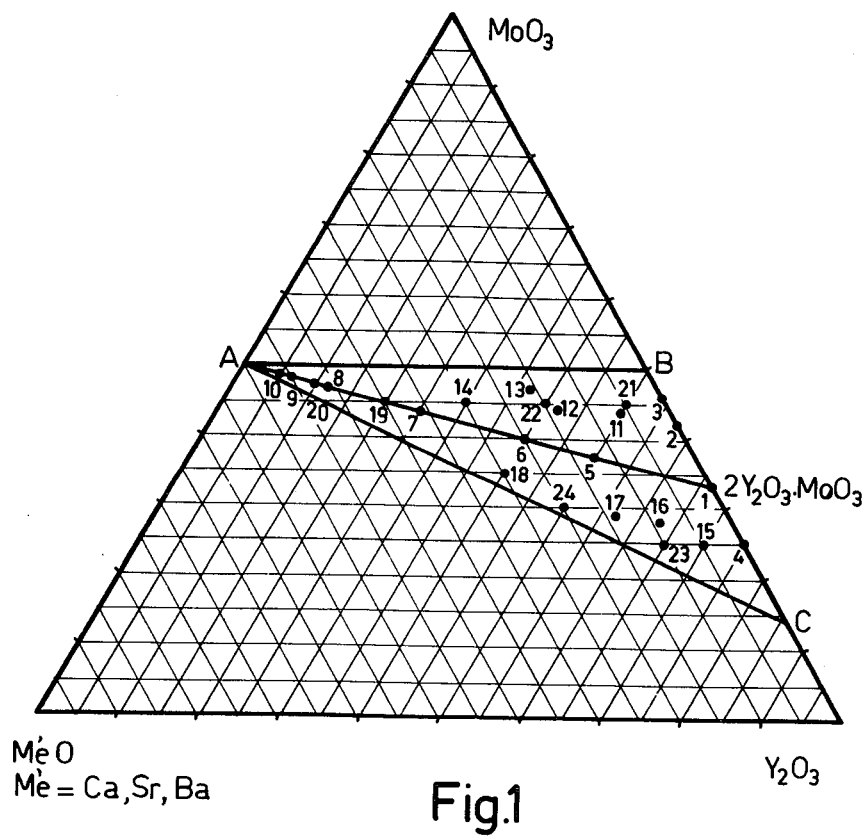

The starting mixture may furthermore comprise per mol of $Y_2O_3$ and $MoO_3$ up to 8 moles of CaO and/or SrO and/or BaO combined with one mol of $MoO_3$ per mol of alkaline earth oxide. The starting mixture may alternatively comprise up to 10 moles of ZnO and/or MgO and/or CdO per mol of $Y_2O_3$ and $MoO_3$.

Paramount use: blue absorbing layer in fluorescent lamps having a satisfactory color rendition.

---

The invention relates to a method of manufacturing a pigment, particularly an inorganic yellow-colored pigment. Furthermore the invention relates to such a pigment and to a low-pressure mercury vapor discharge lamp including such a pigment.

The present invention provides novel compounds which as a result of their physical and chemical properties can advantageously be used as a pigment having an unsaturated yellow color, for example, in paints and lacquers. Furthermore an important use of such yellow pigments is found in low-pressure mercury vapor discharge lamps provided with a luminescent layer, also sometimes referred to as fluorescent lamps and this particularly fluorescent lamps having a satisfactory color rendition.

To obtain a satisfactory rendition of the colors of articles irradiated by a fluorescent lamp it is necessary to suppress the intensity of the blue mercury lines emitted by the mercury vapor discharge at wavelengths of 405 and 436 nm. To what extent this suppression is to be effected is dependent on the desired quality of the color rendition and on the desired color temperature of the lamp. An attenuation of the said blue mercury lines can be obtained if the wall of the lamp is provided with a layer which includes a light yellow colored red luminescing material which absorbs at least a part of the blue mercury radiation. The emitted radiation of this luminescent material provides a desired contribution in the red part of the spectrum of the radiation emitted by the lamp. This known step is described in United Kingdom patent specification 737,828. Magnesium arsenate activated by quadrivalent manganese is used in practice as a blue absorbing red luminescing material. Furthermore the lamp includes a second luminescent layer which is provided on the absorption layer and which comprises one or more luminescent materials with which it is possible to achieve the desired spectral distribution of the radiation emitted by the lamp.

A drawback of the use of said arsenate in the blue absorbing layer of fluorescent lamps is that the layer must be comparatively thick so as to obtain the desired absorption. This gives rise to loss of light due to an inadmissibly high absorption of the radiation emitted by the second luminescent layer. A further drawback is that it is very difficult to maintain the layer thickness of the absorption layer constant during manufacture of the lamps so that fairly greatly differences may occur between the lamps themselves as regards both the percentage of blue and the percentage of red radiation.

The drawbacks described above may be partly obviated if the manganese content of magnesium arsenate is increased. In that case a stronger yellow colored arsenate is obtained which better absorbs the blue mercury radiation so that thinner layers may be used. Furthermore the quantum efficiency of arsenate decreases so that the contribution of arsenate to the red radiation emitted by the lamp is only slight. The desired percentage of red radiation may then be obtained with other luminescent materials present in the lamp.

Furthermore it is known from United Kingdom patent specification 1,119,220 to add a given quantity of titanium dioxide to an absorption layer of fluorescent lamps containing manganese-activated magnesium arsenate in order to limit the quantity of ultraviolet radiation emitted by the lamp as much as possible. Due to the presence of titanium dioxide which highly absorb the ultraviolet radiation in the layer the quantity of the ultraviolet radiation generated by the discharge and reaching the arsenate will be smaller than in the case of a layer without titanium dioxide. As a result the contribution of arsenate to the red radiation emitted by the lamp is negligibly small. Such a layer comprising manganese-activated magnesium arsenate and titanium dioxide thus acts substantially exclusively as an absorption or filter layer. The material of such an absorption layer has a diffuse reflection for radiation at a wavelength of 400 nm. which is still approximately 35% whereas this reflection is only 80 to 85% at a wavelength of 500 nm. It is evident that the known absorption layer is far from ideal in view of the requirements to be imposed, namely high absorption of ultraviolet and blue radiation and great permeability of the other visible radiation. One of the features of the invention is to give an improvement in this respect to providing a pigment with which it is possible to make absorption layers which satisfactorily meet the imposed requirements.

According to the invention a method of manufacturing a pigment is characterized in that a mixture is made comprising yttrium oxide $(Y_2O_3)$ and molybdenum oxide $(MoO_3)$ in which the molar ratio between $Y_2O_3$ and $MoO_3$ has a value of between 6 and 1 and in which up to 75 mol percent of $Y_2O_3$ may be replaced by one or more of the oxides of the rare earth metals and up to 75 mol percent of $MoO_3$ may be replaced by tungsten oxide or comprising compounds which can produce the said oxides, the mixture being reacted at an elevated temperature thereby forming a pigment which comprises a compound defined by the formula $2(Y_{1-x}Ln_x)_2O_3 \cdot (Mo_{1-y}W_y)O_3$ in which formula Ln represents one or more of the rare earth metals having an atomic number of between 57 and 71 and in which $0 \leq x \leq 0.75$ and $0 \leq y \leq 0.75$.

A pigment according to the invention has an unsaturated yellow color. So far this color could only be obtained by mixing one of the known deep yellow pigments with a white pigment. The pigments according to the invention have the further advantage that they can be readily dispersed in the conventional lacquers and that they have a satisfactory coating strength.

The reflection spectrum of the pigments according to the invention shows that these pigments have a high absorption for radiation at wavelengths up to approximately 440 nm. and a low absorption for radiation at wavelengths of more than approximately 500 nm. When using the pigment in the absorption layer of a fluorescent lamp this leads to important advantages. In the first place layer thicknesses may be used which are thinner than those of the layers comprising the known arsenate and titanium dioxide so that loss of light as a result of absorption of radiation generated in the second luminescent layer is reduced to a minimum. In the second place titanium dioxide may be omitted in the absorption layer because the pigments according to the invention also satisfactorily absorb ultraviolet radiation. For providing the absorption layer it is thus unnecessary to have a suspension available which comprises more components. Such a suspension comprising more components generally leads to practical difficulties during processing. In the third place the pigments according to the invention, when used in fluorescent lamps, give rise to greater light outputs as a result of their low absorption of radiation at wavelengths of more than approximately 500 nm. Further advantages of the pigments according to the invention are that they can be readily dispersed in the suspension types commonly used for the manufacture of lamps, a satisfactory stability during lamp manufacture and a satisfactory photochemical stability during operation of the lamps.

All pigments according to the invention comprise the compound $2Y_2O_3 \cdot MoO_3$ which can be shown with the aid of X-ray analysis. This compound has not been previously described and has a triclinic crystal structure and a characteristic X-ray diagram. It has been found that up to a maximum of 75 mol. percent of yttrium oxide may be replaced by a rare earth oxide and up to a maximum of 75 mol. percent of molybdenum oxide may be replaced by tungsten oxide. When these materials are replaced the properties of the pigment change to a slight extent only. Replacement of larger quantities of yttrium and molybdenum oxide gives, however, rise to less satisfacorily usable pigments.

The pigments according to the invention are prepared by mixing the required oxides followed by a temperature treatment of the mixture. Mixing may be effected in the conventional manner. Furthermore it is alternatively possible to constitute compounds of the oxides to be used by means of coprecipitation. For obtaining the $$2Y_2O_3 \cdot MoO_3$$

phase a temperature treatment is, however, always necessary. The ratio between yttrium oxide and molybdenum oxide in the mixture need not be equal to the stoichiometrical value of 2. For this ratio values of between 6 and 1 may be chosen while the properties of the pigments do not noticeably change. The temperature treatment of the mixtures may be effected, for example, in a furnace for 2 to 20 hours at a temperature of between 800 and 1400° C. Instead of the oxides of the said elements it is alternatively possible to use compounds in the starting mixture which can produce these oxides.

A method according to the invention is preferred in which the molar ratio between yttrium oxide (either or not partly replaced by rare earth oxides) and molybdenum oxide (either or not partly replaced by tungsten oxide) in the mixture has a value of between 3 and 1.5. In fact, the most suitable pigments are obtained at these values. Particularly the value of 2 is preferred for the said molar ratio.

It has been found that a third component can be added to the mixture of yttrium oxide and molybdenum oxide, namely an alkaline earth oxide or a compound which can produce this oxide. With an increasing content of calcium, strontium and/or barium oxide in the mixture the physical properties of the obtained pigments are found to vary only very slowly. However, the quantity of alkaline earth oxide may be not more than 8 moles per mol of yttrium oxide or molybdenum oxide. When adding an alkaline earth oxide one extra mol of molybdenum oxide is to be added to the mixture per mol of alkaline earth oxide. Thus the addition of the third component may be considered as an addition of alkaline earth molybdate, for example, CaO, $MoO_3$. The extra added molybdenum oxide may again be replaced by tungsten oxide up to a maximum of 75 mol percent. A method according to the invention in which the mixture also includes an alkaline earth oxide has the great advantage that pigments can be manufactured which are considerably cheaper than the pure $2Y_2O_3 \cdot MoO_3$-phase because comparatively high contents of cheap alkaline earth oxide may be used while maintaining the satisfactory properties of the pigment.

In a method according to the invention it is alternatively possible to add as a third component to the mixture one or more of the oxides of zinc, magnesium and cadmium or compounds which can produce these oxides, which also gives rise to cheaper pigments. The maximum quantity to be used for the said oxides is 10 moles per mol of yttrium oxide and molybdenum oxide. However, the contents of magnesium oxide must be not more than 5 moles and the contents of cadmium oxide must be not more than 1 mol per mol of yttrium oxide and molybdenum oxide. If the limits imposed on the quantity of oxide to be used as a third component are not exceeded, pigments are obtained which have properties which are mainly equal to those of $2Y_2O_3 \cdot MoO_3$.

It is to be noted that the pigment obtained also when a third component is present in the starting mixture always comprises the $2Y_2O_3 \cdot MoO_3$ phase which can be proved by way of X-ray analysis.

Likewise as the known blue absorbing manganese-activated magnesium arsenate the pigments according to the invention can be used in fluorescent lamps having a satisfactory color rendition as a separate absorption layer which is then coated by a second luminescent layer. The absorption layer may be provided in known manner with the aid of a suspension. As a result of the very satisfactory absorption properties of the pigments according to the invention it is furthermore possible to mix the pigments with the luminescent materials and to provide subsequently both materials in one layer on the envelope of the lamp. This has the advantage that the lamps can be manufactured more easily and that they do not show substantially any mutual differences in the intensity of the emitted blue radiation.

In order that the invention may be readily carried into effect it will now be described in detail by way of example with reference to some tables and a drawing.

Figure 2:
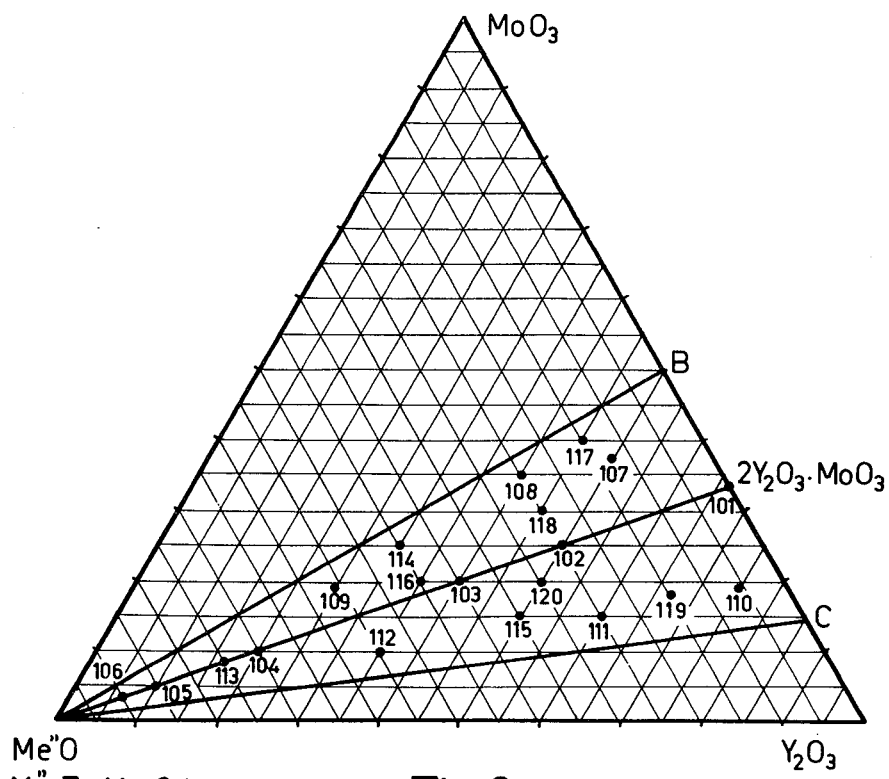
Figure 3:
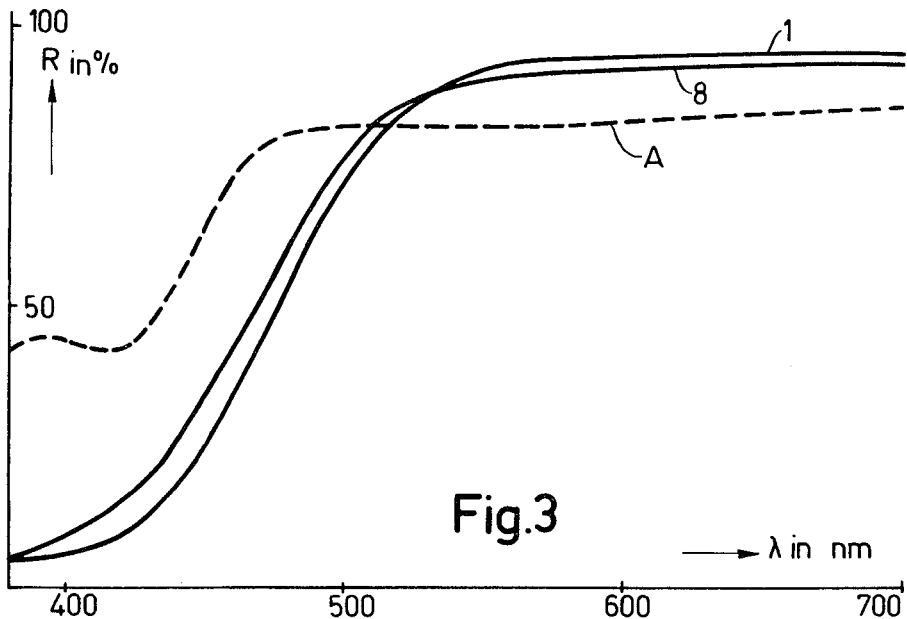

In the drawing FIG. 1 shows the ternary system Me'O-$MoO_3$-$Y_2O_3$ in which Me' represents calcium strontium or barium. Similarly FIG. 2 shows the ternary system Me"O-$MoO_3$-$Y_2O_3$ in which Me" represents zinc, magnesium or cadmium. A number of pigments according to the invention is denoted by dots in FIGS. 1 and 2, the location of each dot in these figures being a measure of the molar ratio of the composite oxides of the relevant pigment. FIG. 3 shows the diffuse reflection spectrum of some pigments according to the invention.

EXAMPLE

A mixture was made of

|  | Mol |
|---|---|
| $CaCO_3$ | 0.125 |
| $Y_2O_3$ | 0.500 |
| $MoO_3$ | 0.375 |

This mixture was heated in air in a furnace for 2 hours at a temperature of 1200° C. After cooling of the firing product obtained it was pulverized and sieved. Subsequently the product was subjected to a second heat treatment in air for 2 hours at a temperature of 1300° C. After cooling, pulverizing and sieving the product was ready. It consists of a yellow pigment which, according to X-ray analysis, is found to comprise the compound $2Y_2O_3 \cdot MoO_3$ and furthermore calciummolybdate $$(CaO \cdot MoO_3)$$

Analogously as described in the above-mentioned example, a large number of pigments according to the invention was manufactured. It was found that the heating period and temperature can be chosen within wide limits, for example, between 2 and 20 hours and between 800 and 1400° C. Generally it is advantageous to perform the heat treatment in two or more stages, the firing products being pulverized and sieved between these stages.

Table I below states the diffuse reflection of radiation at given wavelengths in the range of from 380 to 700 nm. in percents for a number of pigments according to the invention. The examples included in the table are provided with numerals in the first column corresponding to the numerals given in FIG. 1. Thus for each example the molar ratio of the oxides present in the pigment can be determined with reference to FIG. 1. Examples 1, 2, 3 and 4 relates to pigments prepared from mixtures containing only $Y_2O_3$ and $MoO_3$ in different molar ratios. Example 1 relates to the $2Y_2O_3 \cdot MoO_3$ phase prepared from a stoichiometric firing mixture. It was found that considerable deviations from the stoichiometric ratio are possible while only slight differences in the reflection spectrum of the pigments obtained occur. The further examples of Table I relate to pigments according to the invention which comprise calcium, strontium or barium oxide. In the ternary system shown in FIG. 1 these pigments are all found in the range determined by the triangle ABC. The reflection measurements included in Table I show that the favorable reflection properties of the pigments are maintained even when they contain relatively much alkaline earth metal oxide.

TABLE I.—(SEE FIG. 1)

| Example | Me′ | Diffuse reflection of .. nm. radiation in percent | | | | | | | | | | |
|---|---|---|---|---|---|---|---|---|---|---|---|---|
| | | 380 | 400 | 420 | 440 | 460 | 480 | 500 | 550 | 600 | 650 | 700 |
| 1 | | 4 | 5 | 9 | 18 | 34 | 54 | 72 | 92 | 94 | 95 | 95 |
| 2 | | 9 | 10 | 17 | 28 | 46 | 63 | 77 | 89 | 90 | 90 | 91 |
| 3 | | 10 | 19 | 28 | 40 | 55 | 69 | 79 | 85 | 85 | 86 | 87 |
| 4 | | 4 | 8 | 19 | 38 | 60 | 75 | 83 | 90 | 91 | 91 | 91 |
| 5 | Ca | 5 | 6 | 9 | 18 | 33 | 54 | 72 | 91 | 94 | 96 | 95 |
| 6 | Ca | 6 | 8 | 13 | 23 | 41 | 60 | 77 | 93 | 96 | 96 | 96 |
| 7 | Ca | 3 | 4 | 8 | 17 | 34 | 54 | 72 | 90 | 93 | 94 | 95 |
| 8 | Ca | 6 | 9 | 15 | 26 | 42 | 61 | 77 | 90 | 92 | 93 | 93 |
| 9 | Ca | 9 | 13 | 20 | 32 | 49 | 65 | 78 | 88 | 91 | 93 | 94 |
| 10 | Ca | 10 | 14 | 22 | 34 | 53 | 70 | 81 | 93 | 95 | 96 | 97 |
| 11 | Ca | 7 | 8 | 16 | 27 | 45 | 63 | 76 | 88 | 88 | 89 | 90 |
| 12 | Ca | 6 | 7 | 14 | 25 | 42 | 61 | 75 | 88 | 90 | 90 | 90 |
| 13 | Ca | 8 | 15 | 25 | 37 | 54 | 69 | 81 | 88 | 89 | 90 | 90 |
| 14 | Ca | 9 | 13 | 20 | 32 | 50 | 68 | 81 | 93 | 94 | 94 | 94 |
| 15 | Ca | 4 | 7 | 19 | 39 | 61 | 78 | 86 | 94 | 97 | 96 | 96 |
| 16 | Ca | 4 | 7 | 17 | 34 | 55 | 72 | 82 | 91 | 92 | 92 | 92 |
| 17 | Ca | 4 | 8 | 20 | 40 | 61 | 77 | 86 | 95 | 94 | 94 | 96 |
| 18 | Ca | 8 | 14 | 26 | 45 | 64 | 78 | 87 | 94 | 95 | 95 | 95 |
| 5 | Sr | 5 | 6 | 9 | 17 | 32 | 52 | 70 | 88 | 92 | 93 | 93 |
| 19 | Sr | 5 | 7 | 13 | 24 | 42 | 62 | 77 | 92 | 95 | 95 | 96 |
| 20 | Sr | 8 | 11 | 18 | 30 | 47 | 65 | 78 | 90 | 91 | 91 | 92 |
| 21 | Sr | 8 | 15 | 25 | 37 | 52 | 69 | 80 | 90 | 90 | 90 | 90 |
| 22 | Sr | 8 | 13 | 22 | 34 | 51 | 68 | 79 | 90 | 91 | 92 | 93 |
| 23 | Sr | 5 | 10 | 14 | 45 | 64 | 79 | 86 | 92 | 93 | 94 | 94 |
| 24 | Sr | 6 | 12 | 26 | 44 | 62 | 76 | 85 | 91 | 91 | 92 | 92 |
| 5 | Ba | 4 | 4 | 8 | 17 | 35 | 55 | 72 | 92 | 94 | 95 | 95 |
| 18 | Ba | 6 | 13 | 26 | 46 | 65 | 79 | 85 | 92 | 95 | 95 | 95 |
| 19 | Ba | 5 | 7 | 12 | 22 | 40 | 60 | 74 | 91 | 95 | 95 | 95 |
| 20 | Ba | 7 | 11 | 17 | 28 | 46 | 64 | 75 | 87 | 90 | 92 | 92 |
| 21 | Ba | 7 | 13 | 21 | 33 | 50 | 67 | 77 | 86 | 89 | 90 | 91 |
| 22 | Ba | 5 | 8 | 14 | 26 | 43 | 61 | 71 | 83 | 87 | 89 | 90 |
| 23 | Ba | 5 | 10 | 23 | 42 | 63 | 78 | 86 | 93 | 95 | 95 | 95 |
| 24 | Ba | 6 | 12 | 26 | 45 | 64 | 77 | 86 | 93 | 94 | 95 | 95 |

Table II, likewise as Table I, states the results of reflection measurements on pigments according to the invention which comprise zinc, magnesium or cadmium oxide. These pigments according to the invention have a composition which can be represented in the ternary system of FIG. 2 by means of a dot in the triangle constituted by the dots Me″O, B and C. For each example of Table II the molar ratio of the composite oxides can be read in FIG. 2. Again it is found that pigments may contain relatively much zinc, magnesium or cadmium oxide while maintaining the satisfactory reflection properties.

TABLE II.—(SEE FIG. 2)

| Example | Me″ | Diffuse reflection of .. nm. radiation in percent | | | | | | | | | | |
|---|---|---|---|---|---|---|---|---|---|---|---|---|
| | | 380 | 400 | 420 | 440 | 460 | 480 | 500 | 550 | 600 | 650 | 700 |
| 101 | | 4 | 5 | 9 | 18 | 34 | 54 | 72 | 92 | 94 | 95 | 95 |
| 102 | Zn | 5 | 6 | 10 | 18 | 35 | 56 | 73 | 93 | 94 | 94 | 95 |
| 103 | Zn | 4 | 5 | 9 | 18 | 33 | | 72 | 92 | 94 | 94 | 94 |
| 104 | Zn | 4 | 7 | 12 | 21 | 37 | 57 | 73 | 89 | 91 | 90 | 90 |
| 105 | Zn | 4 | 9 | 14 | 24 | 40 | 60 | 76 | 90 | 91 | 91 | 91 |
| 106 | Zn | 4 | 12 | 18 | 28 | 43 | 62 | 76 | 88 | 90 | 90 | 91 |
| 107 | Zn | 8 | 15 | 22 | 32 | 50 | 67 | 79 | 90 | 90 | 91 | 92 |
| 108 | Zn | 10 | 23 | 34 | 45 | 60 | 74 | 82 | 90 | 90 | 90 | 91 |
| 109 | Zn | 6 | 15 | 23 | 34 | 51 | 68 | 79 | 90 | 90 | 91 | 92 |
| 110 | Zn | 5 | 8 | 19 | 46 | 73 | 86 | 99 | 93 | 92 | 92 | 93 |
| 111 | Zn | 5 | 7 | 19 | 46 | 75 | 88 | 91 | 94 | 94 | 94 | 93 |
| 112 | Zn | 4 | 7 | 18 | 45 | 73 | 87 | 92 | 94 | 94 | 93 | 94 |
| 102 | Mg | 5 | 7 | 12 | 23 | 40 | 60 | 76 | 93 | 97 | 95 | 95 |
| 103 | Mg | 7 | 8 | 13 | 24 | 41 | 62 | 78 | 96 | 98 | 98 | 99 |
| 104 | Mg | 12 | 14 | 20 | 31 | 47 | 66 | 80 | 95 | 96 | 96 | 96 |
| 107 | Mg | 9 | 14 | 22 | 34 | 52 | 69 | 81 | 91 | 92 | 92 | 94 |
| 109 | Mg | 13 | 20 | 28 | 42 | 57 | 73 | 84 | 94 | 95 | 95 | 95 |
| 110 | Mg | 6 | 11 | 22 | 39 | 58 | 75 | 84 | 95 | 95 | 96 | 96 |
| 113 | Mg | 12 | 15 | 20 | 31 | 48 | 67 | 81 | 96 | 97 | 98 | 98 |
| 114 | Mg | 11 | 20 | 30 | 41 | 58 | 73 | 84 | 92 | 93 | 94 | 95 |
| 115 | Mg | 8 | 10 | 21 | 47 | 73 | 87 | 92 | 95 | 96 | 95 | 96 |
| 102 | Cd | 5 | 6 | 11 | 21 | 39 | 60 | 76 | 91 | 94 | 94 | 95 |
| 103 | Cd | 5 | 6 | 10 | 19 | 36 | 56 | 73 | 90 | 92 | 93 | 93 |
| 107 | Cd | 8 | 14 | 21 | 34 | 52 | 70 | 80 | 90 | 92 | 92 | 93 |
| 110 | Cd | 5 | 9 | 19 | 35 | 54 | 71 | 83 | 93 | 94 | 94 | 95 |
| 111 | Cd | 6 | 8 | 20 | 45 | 71 | 86 | 92 | 96 | 96 | 97 | 96 |
| 114 | Cd | 20 | 26 | 33 | 43 | 58 | 70 | 77 | 82 | 84 | 84 | 85 |
| 116 | Cd | 6 | 7 | 11 | 20 | 36 | 56 | 71 | 87 | 90 | 90 | 91 |
| 117 | Cd | 9 | 16 | 26 | 38 | 55 | 72 | 84 | 93 | 93 | 96 | 95 |
| 118 | Cd | 5 | 6 | 10 | 18 | 34 | 55 | 72 | 90 | 91 | 94 | 93 |
| 119 | Cd | 6 | 9 | 21 | 42 | 64 | 79 | 88 | 94 | 94 | 95 | 95 |
| 120 | Cd | 5 | 6 | 13 | 26 | 45 | 65 | 79 | 91 | 93 | 94 | 93 |

Replacement up to 75 mol percent of yttrium oxide by one or more of the rare earth oxides in a pigment according to the invention is possible. Table III below states the results of reflection measurements on pigments defined by the formula $2(Y_{1-x}Ln_x)_2O_3 \cdot MoO_3$, in which Ln represents lanthanum or gadolinium and $x$ has different values. For $x=1$ (Example a) in which yttrium is completely replaced by lanthanum a pigment is obtained which is less suitable for practical uses.

TABLE III $2(Y_{1-x}Ln_x)_2O_3 \cdot MoO_3$

| Example | Ln | $x$ | Diffuse reflection of .. nm. radiation in percent ||||||||||
|---|---|---|---|---|---|---|---|---|---|---|---|---|
| | | | 380 | 400 | 420 | 440 | 460 | 480 | 500 | 550 | 600 | 650 | 700 |
| 201 | La | 0 | 3 | 5 | 9 | 20 | 38 | 58 | 75 | 93 | 96 | 95 | 96 |
| 202 | La | 0.25 | 4 | 6 | 15 | 36 | 62 | 78 | 84 | 89 | 89 | 88 | 89 |
| 203 | La | 0.50 | 5 | 8 | 17 | 35 | 59 | 76 | 85 | 92 | 93 | 92 | 93 |
| 204 | Gd | 0.50 | 3 | 5 | 10 | 21 | 38 | 58 | 73 | 91 | 95 | 94 | 97 |
| 205 | La | 0.75 | 4 | 8 | 19 | 40 | 63 | 79 | 86 | 92 | 93 | 93 | 94 |
| a | La | 1.0 | 4 | 11 | 3 | 59 | 75 | 80 | 82 | 88 | 90 | 91 | 93 |

Molybdenum oxide in a pigment according to the invention may be replaced up to 75 mol percent by tungsten oxide. Table IV shows that the satisfactory reflection properties are then maintained. A complete replacement of molybdenum by tungsten (Example b) leads to an unusable pigment.

TABLE IV $2Y_2O_3 \cdot (Mo_{1-y}W_y)O_3$

| Example | $y$ | Diffuse reflection of .. nm. radiation in percent ||||||||||
|---|---|---|---|---|---|---|---|---|---|---|---|
| | | 380 | 400 | 420 | 440 | 460 | 480 | 500 | 550 | 600 | 650 | 700 |
| 301 | 0 | 3 | 5 | 9 | 20 | 37 | 57 | 74 | 93 | 96 | 95 | 95 |
| 302 | 0.25 | 4 | 6 | 13 | 24 | 43 | 62 | 78 | 94 | 96 | 95 | 95 |
| 303 | 0.50 | 5 | 10 | 18 | 32 | 51 | 68 | 81 | 94 | 95 | 94 | 95 |
| 304 | 0.75 | 9 | 17 | 29 | 45 | 63 | 76 | 86 | 95 | 96 | 94 | 94 |
| b | 1.0 | 63 | 75 | 83 | 88 | 92 | 92 | 93 | 94 | 95 | 95 | 95 |

In FIG. 3 of the drawing the curves 1 and 8 show the diffuse reflection spectrum of the pigments according to Examples 1 and 8 from Table I. The reflection R is vertically plotted in percent and the wavelength λ of the incident radiation is horizontally plotted in nm. For the purpose of comparison the broken-line curve A is included which represents the reflection of the known manganese-activated magnesium arsenate mixed with 10% by weight of titanium dioxide. It is clearly evident that the pigments according to the invention in the wavelength range of below approximately 440 nm. have a higher absorption than the known pigment and that they furthermore have a higher reflection at wavelengths of more than approximately 500 nm.

What is claimed is:

1. A method of producing a pigment of the formula $2(Y_{1-x}Ln_x)_2O_3 \cdot (Mo_{1-y}W_y)O_3$ wherein Ln is at least one rare earth metal having an atomic number of between 57 and 71, wherein $1 \leqslant x \leqslant 0.75$ and $0 \leqslant y \leqslant 0.75$, said method comprising; preparing a mixture of $Y_2O_3$ and $MoO_3$ in the molar ratio of between 6 and 1, in which up to 75 mol percent of $Y_2O_3$ is replaceable by one or more oxides of the rare earth metals having an atomic number of between 57 and 71 and in which up to 75 mol percent of $MoO_3$ is replaceable by tungsten oxide or compounds yielding said oxides and heating said mixture at a temperature of between 800 and 1400° C.

2. A method as claimed in claim 1, characterized in that the molar ratio between $Y_2O_3$ and $MoO_3$ in the mixture has a value of between 3 and 1.5.

3. A method as claimed in claim 2, characterized in that the molar ratio between $Y_2O_3$ and $MoO_3$ in the mixture substantially has the value of 2.

4. A method as claimed in claim 1, characterized in that per mol of yttrium oxide and molybdenum oxide up to 8 moles of at least one of the oxides of the alkaline earth metals calcium, strontium and barium are added to the mixture and that furthermore one mol of molybdenum oxide is added per mol of alkaline earth oxide, in which up to 75 mol percent of $MoO_3$ may be replaced by tungsten oxide and in which instead of said oxides compounds which can produce these oxides may alternatively be used.

5. A method as claimed in claim 1, characterized in that up to 10 moles of at least one of the oxides of zinc, magnesium and cadmium or of compounds which can produce these oxides are added to the mixture per mole of yttrium oxide and molybdenum oxide, the mixture comprising not more than 5 moles of magnesium oxide and not more than 1 mol of cadmium oxide per mol of yttrium oxide and molybdenum oxide.

6. A pigment comprising a mixed oxide defined by the formula $2(Y_{1-x}Ln_x)_2O_3 \cdot (Mo_{1-y}W_y)O_3$ in which Ln represents one or more of the rare earth metals having an atomic number of between 57 and 71 and in which $0 \leqslant x \leqslant 0.75$ and $0 \leqslant y \leqslant 0.75$.

References Cited

UNITED STATES PATENTS

| 3,174,822 | 3/1965 | Borchardt | 423—263 |
| 3,207,573 | 9/1965 | Borchardt | 423—593 |
| 3,437,432 | 4/1969 | Borchardt | 423—263 |

DELBERT E. GANTZ, Primary Examiner

S. L. BERGER, Assistant Examiner

U.S. Cl. X.R.

106—296, 301, 306; 252—300; 313—109; 423—263, 593.